US008787695B2

(12) United States Patent
Wu et al.

(10) Patent No.: US 8,787,695 B2
(45) Date of Patent: Jul. 22, 2014

(54) IMAGE RECTIFICATION USING TEXT LINE TRACKS

(71) Applicants: Hao Wu, Rochester, NY (US); Kevin Edward Spaulding, Spencerport, NY (US)

(72) Inventors: Hao Wu, Rochester, NY (US); Kevin Edward Spaulding, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 20 days.

(21) Appl. No.: 13/681,488

(22) Filed: Nov. 20, 2012

(65) Prior Publication Data

US 2014/0140635 A1 May 22, 2014

(51) Int. Cl.
*G06K 9/32* (2006.01)
(52) U.S. Cl.
USPC ............................................ 382/266; 382/294
(58) Field of Classification Search
USPC ......... 382/173, 176, 266, 275, 286, 294–296, 382/300; 358/462
See application file for complete search history.

(56) References Cited

U.S. PATENT DOCUMENTS

2010/0073735 A1   3/2010 Hunt et al.

OTHER PUBLICATIONS

Liang et al., "Flattening Curved Documents in Images," Proc. IEEE Computer Society Conference on Computer Vision and Pattern Recognition, vol. 2, pp. 338-345 (2005).
Shafait et al., "Document image dewarping contest," 2nd International Workshop on Camera-Based Document Analysis and Recognition, pp. 181-188 (2007).
Gatos et al., "Segmentation based recovery of arbitrarily warped document images," Proc. Int. Conf. on Document Analysis and Recognition, pp. 989-993 (2007).
Bukhari et al., "Script-independent handwritten textlines segmentation using active contours," 10th International Conference on Document Analysis and Recognition, pp. 446-450 (2009).
Tian et al., "Rectification and 3D reconstruction of curved document images," Proc. IEEE Computer Society Conference on Computer Vision and Pattern Recognition, pp. 377-384 (2011).

*Primary Examiner* — Duy M Dang
(74) *Attorney, Agent, or Firm* — Kevin E. Spaulding

(57) ABSTRACT

This invention is a method for rectifying an input digital image including warped textual information. The method includes analyzing the input digital image to determine a plurality of text line traces that track along with the warped textual lines in a substantially parallel fashion. The input digital image is subdivided into a plurality of vertical slices, each having associated first and second slice edges and an associated slice width. Vertical slice deformation models are formed for the vertical slices by identifying a plurality of text line traces that cross a particular vertical slice, and fitting a parametric function that predicts second-edge vertical coordinates for the text line traces as a function of corresponding first-edge vertical coordinates. A plurality of streamlines are formed responsive to the vertical slice deformation models. A global deformation function is formed by interpolating between the streamlines and is used to form a rectified image.

14 Claims, 20 Drawing Sheets

FIG. 3B

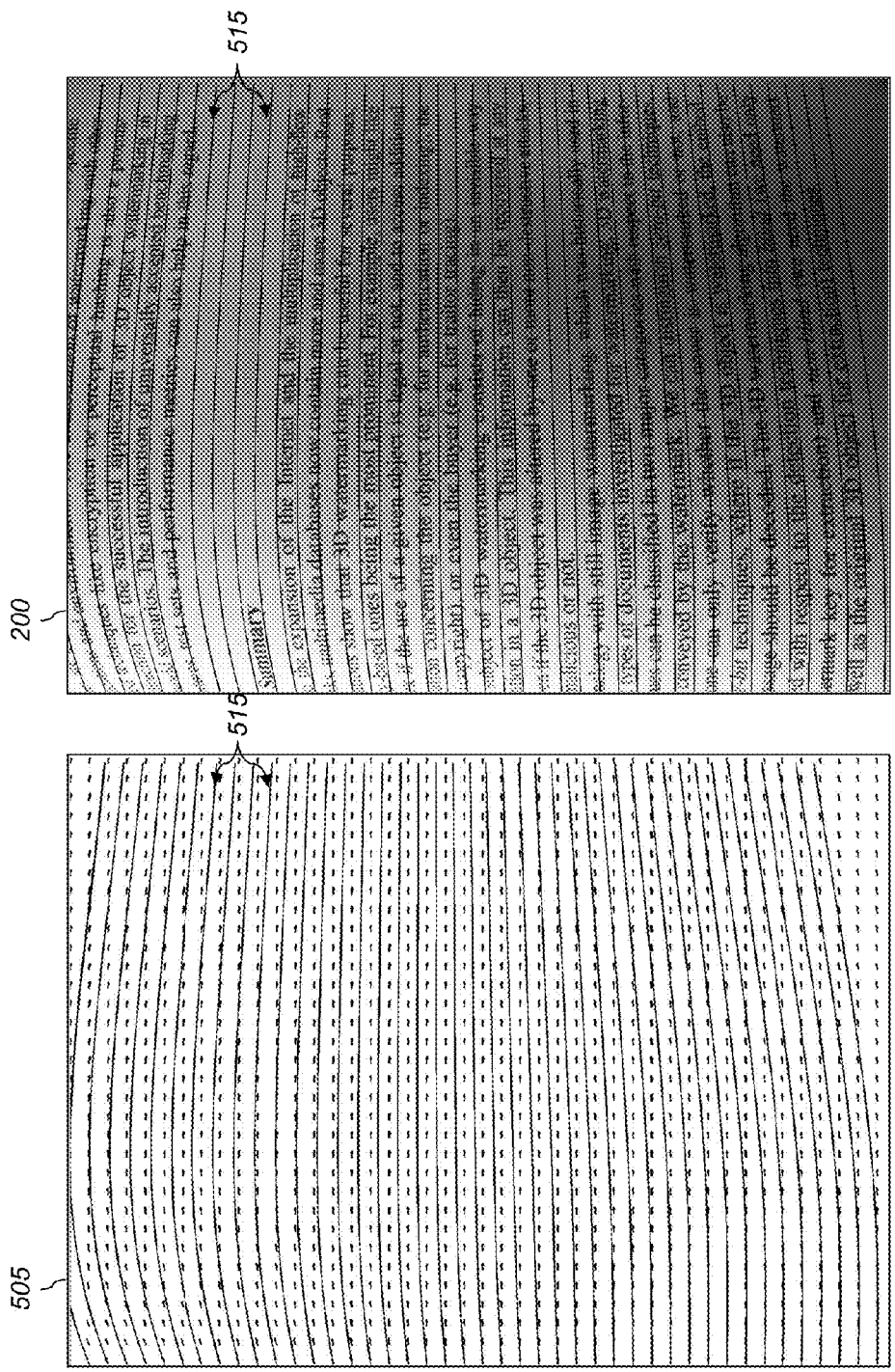

ual information. Good quality results can typically be obtained for original documents that are flat, but problems can occur for pages which do not lie flat on the scanner platen. For example, if a page from a book or a magazine is scanned, the page will generally be curved near the bound edge. The curvature of the document page can result in a geometric distortion of the scanned image where image content that should have been horizontal (e.g., lines of text) may be reproduced as curved lines.
IMAGE RECTIFICATION USING TEXT LINE TRACKS

CROSS-REFERENCE TO RELATED APPLICATIONS

Reference is made to commonly assigned, co-pending U.S. patent application Ser. No. 13/681,461, entitled: "Image rectification using sparsely-distributed local features", by Wu et al.; and to commonly assigned, co-pending U.S. patent application Ser. No. 13/681,472, entitled: "Image rectification using an orientation vector field", by Wu et al., each of which is incorporated herein by reference.

FIELD OF THE INVENTION

This invention pertains to the field of digital imaging and more particularly to a method for rectifying images having warped textual information.

BACKGROUND OF THE INVENTION

Documents are frequently digitized using a digital scanner, such as a flat bed scanner. The scanned documents can be printed or stored for later viewing, or can be processed with an optical character recognition method to extract textual information. Good quality results can typically be obtained for original documents that are flat, but problems can occur for pages which do not lie flat on the scanner platen. For example, if a page from a book or a magazine is scanned, the page will generally be curved near the bound edge. The curvature of the document page can result in a geometric distortion of the scanned image where image content that should have been horizontal (e.g., lines of text) may be reproduced as curved lines.

Digital cameras are increasingly being used to digitize documents. For example, a user may capture an image of a document (e.g., a page of a book) using an application on a camera phone. The problem of introducing geometric distortions due to curvature of the original document can be quite severe in many cases due to the fact that the document and camera positions have fewer constraints. These geometric distortions will frequently cause horizontal features (e.g., lines of text) in the original document to be reproduced as warped curves. Therefore, there is a need for image rectification methods that can be used to process digital images containing warped textual lines.

Liang et al., in an article entitled "Flattening curved documents in images" (Proc. IEEE Computer Society Conference on Computer Vision and Pattern Recognition, Vol. 2, pp. 338-345, 2005), have described a method for correcting distortion in a document image including page warping. The method involves modeling the page surface as a developable surface and exploits the parallelism and equal line spacing properties of printed textual content. Local texture flow directions are determined based on dividing the image into small blocks and performing projection profile analysis. The method is computationally complex and requires a relatively dense distribution of textual features to enable the determination of texture flow directions throughout the document.

Shafait et al., in an article entitled "Document image dewarping contest" (2nd International Workshop on Camera-Based Document Analysis and Recognition, pp. 181-188, 2007), compare a number of different methods for dewarping a document image. A first method involves constructing an outer skeleton for text regions using Bezier curves. An image deformation is determined to warp the image based on the determined Bezier curves. A second method involves detecting words, and linking consecutive words to define text lines. Upper and lower baselines are calculated for each word, and transformation factors are determined to rotate and shift the words accordingly. A third method uses a coordinate transform model and document rectification process for book dewarping. The assumption is made that the book surface is a cylinder and a transformation function is formed based on straight lines representing the left and right boundaries of the page and curved lines representing the top and bottom boundaries of the page.

Gatos et al., in an article entitled "Segmentation based recovery of arbitrarily warped document images" (Proc. Int. Conf. on Document Analysis and Recognition, pp. 989-993, 2007), disclose a segmentation-based method for dewarping document images. A horizontal smoothing operation is performed based on a determined average character height. Words are then identified by detecting connected components. Upper and lower boundaries of the identified words are then determined and used to rotate and translate the words to form a de-warped image. The method relies on accurate determination of the orientation of the first word on each text line, which guides the alignment of the entire text line.

Tian et al., in an article entitled "Rectification and 3D reconstruction of curved document images" (Proc. IEEE Computer Society Conference on Computer Vision and Pattern Recognition, pp. 377-384, 2011) describe a method for rectifying images of curved documents. The method involves tracing text lines using a self-similarity measure. Text orientation is estimated using local stroke statistics. Two-dimensional warping is used to make the text lines horizontal and the text orientation vertical. The process of tracing the text lines is computationally intensive and is sensitive to the size of the searching neighborhood. It is not adapted to handle extended regions that do not contain text lines.

U.S. Patent Application Publication 2010/0073735 to Hunt et al., entitled "Camera-based document imaging," describes a method to extract textual information from a warped document image. The method includes detecting typographical features indicating the orientation of text, and fitting curves to the text lines. A grid of quadrilaterals are constructed using vectors that are parallel to the text lines and vectors that are parallel to the direction of the vertical stroke lines. The document is dewarped by stretching the image so that the vectors become orthogonal, and the dewarped document is processed using optical character recognition. The method relies on the accurate identification of each text line.

In general, methods using a physical deformation model to rectify the deformed document image lack the flexibility to handle various deformations in different situations. Most of the methods that estimate the deformation directly from the deformed textual information heavily rely on the accurate identification of long text lines, which limits their application to documents of different types that may contain large areas without long text lines. There remains a need for a reliable and efficient method to rectify images of documents having a wide variety of deformations and may or may not include long warped textual lines.

SUMMARY OF THE INVENTION

The present invention represents a method for rectifying an input digital image including warped textual lines, the method implemented at least in part by a data processing system and comprising:

receiving an input digital image;

analyzing the input digital image to determine a plurality of text line traces that track along with the warped textual lines in a substantially parallel fashion;

subdividing the input digital image into a plurality of vertical slices, each vertical slice having associated first and second slice edges and an associated slice width;

forming vertical slice deformation models for a plurality of the vertical slices by:

identifying a plurality of text line traces that cross a particular vertical slice, each of the identified text line traces having a first-edge vertical coordinate corresponding to the location where the text line trace crosses the first slice edge and a second-edge vertical coordinate corresponding to the location where the text line trace crosses the second slice edge of the vertical slice; and forming the vertical slice deformation model for the particular vertical slice by fitting a parametric function that predicts the second-edge vertical coordinates as a function of the first-edge vertical coordinates;

forming a plurality of streamlines responsive to the vertical slice deformation models, wherein the streamlines represent a deformation of the warped textual lines in the input digital image;

forming a global deformation function by interpolating between the streamlines;

forming a rectified image by rectifying the input digital image responsive to the global deformation function; and storing the rectified image in a processor-accessible memory.

This invention represents a robust and efficient method for rectifying images of documents captured using a digital camera that have warped textual information to produce dewarped documents.

This invention has the advantage that it is insensitive to the content of the document, and does not require identification of individual textual characters or words.

It has the further advantage that it is not necessary to make any assumptions about the shape of the document deformations.

BRIEF DESCRIPTION OF THE DRAWINGS

FIG. 3B shows an exemplary edge image illustrating local features;

FIG. 3G shows an exemplary image illustrating a set of streamlines;

FIG. 3H shows the streamlines of FIG. 3G overlaid on the input image of FIG. 3A;

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 1:
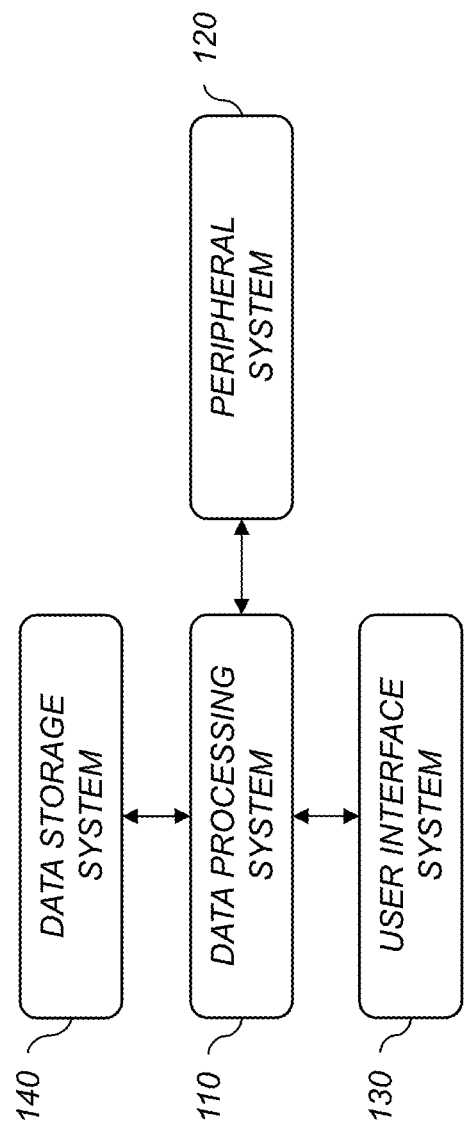
FIG. 1 is a high-level diagram showing the components of a system for performing the present invention.

FIG. 1 is a high-level diagram showing the components of a system for rectifying a digital image according to an embodiment of the present invention. The system includes a data processing system 110, a peripheral system 120, a user interface system 130, and a data storage system 140. The peripheral system 120, the user interface system 130 and the data storage system 140 are communicatively connected to the data processing system 110.

The data processing system 110 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 may be a distributed processor-accessible memory system including multiple processor-accessible memories communicatively connected to the data processing system 110 via a plurality of computers or devices. On the other hand, the data storage system 140 need not be a distributed processor-accessible memory system and, consequently, may include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" is intended to include any type of connection, whether wired or wireless, between devices, data processors, or programs in which data may be communicated. The phrase "communicatively connected" is intended to include a connection between devices or programs within a single data processor, a connection between devices or programs located in different data processors, and a connection between devices not located in data processors at all. In this regard, although the data storage system 140 is shown separately from the data processing system 110, one skilled in the art will appreciate that the data storage system 140 may be stored completely or partially within the data processing system 110. Further in this regard, although the peripheral system 120 and the user interface system 130 are shown separately from the data processing system 110, one skilled in the art will appreciate that one or both of such systems may be stored completely or partially within the data processing system 110.

The peripheral system 120 may include one or more devices configured to provide digital content records to the data processing system 110. For example, the peripheral system 120 may include digital still cameras, digital video cameras, cellular phones, or other data processors. The data processing system 110, upon receipt of digital content records from a device in the peripheral system 120, may store such digital content records in the data storage system 140.

The user interface system 130 may include a mouse, a keyboard, another computer, or any device or combination of devices from which data is input to the data processing system 110. In this regard, although the peripheral system 120 is shown separately from the user interface system 130, the peripheral system 120 may be included as part of the user interface system 130.

The user interface system 130 also may include a display device, a processor-accessible memory, or any device or combination of devices to which data is output by the data processing system 110. In this regard, if the user interface system 130 includes a processor-accessible memory, such memory may be part of the data storage system 140 even though the user interface system 130 and the data storage system 140 are shown separately in FIG. 1.

The present invention will now be described with reference to FIG. 2. The input to the process is an input image 200 that includes warped textual information. The input image 200 can be, for example, an image of a document containing text (e.g., a page of a book, magazine or newspaper) captured with a digital camera (e.g., a digital still camera or a camera phone) or a digital scanner. Often, such images contain geometrical distortions due to curvature of the page being digitized (e.g., due to the book binding or due to the document lying on a non-flat surface), as well as optical distortion of the lens (e.g., pincushion or barrel distortion). As a result, any linear features in the document (e.g., lines of text or table borders) will be warped (e.g., curved or angled). FIG. 3A shows an example of an input image 200 corresponding to an image of a page of a book captured using a camera phone. The input image 200 contains warped textual information 300 where lines of text that occurred as horizontal lines in the original document (i.e., book page) are reproduced as warped curves due to geometrical distortion. In this example, most of the geometrical distortion results from the book page being curved at the time that the image was captured due to the binding of the book.

Figure 2:
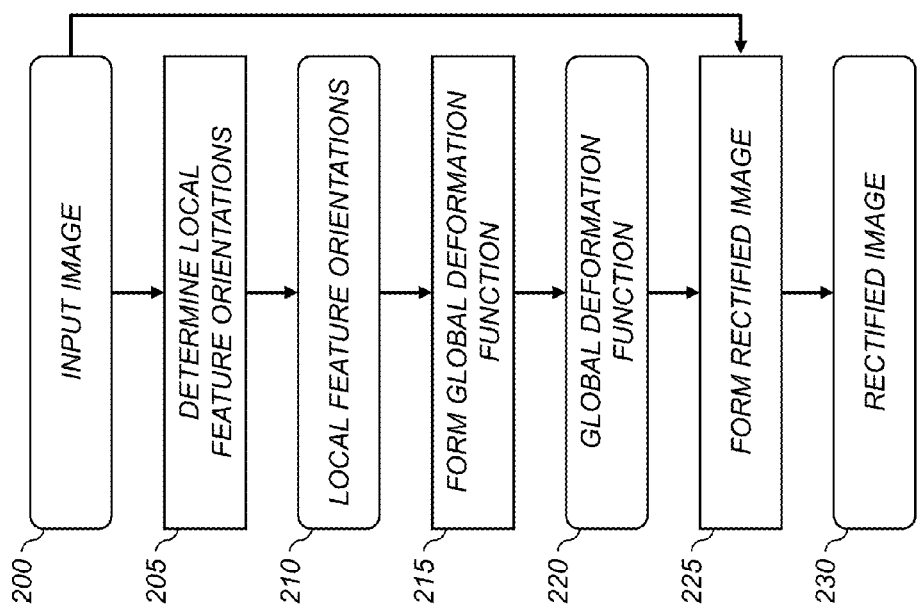
FIG. 2 is a flow diagram of a method for forming a rectified image in accordance with an exemplary embodiment.
Figure 3A:
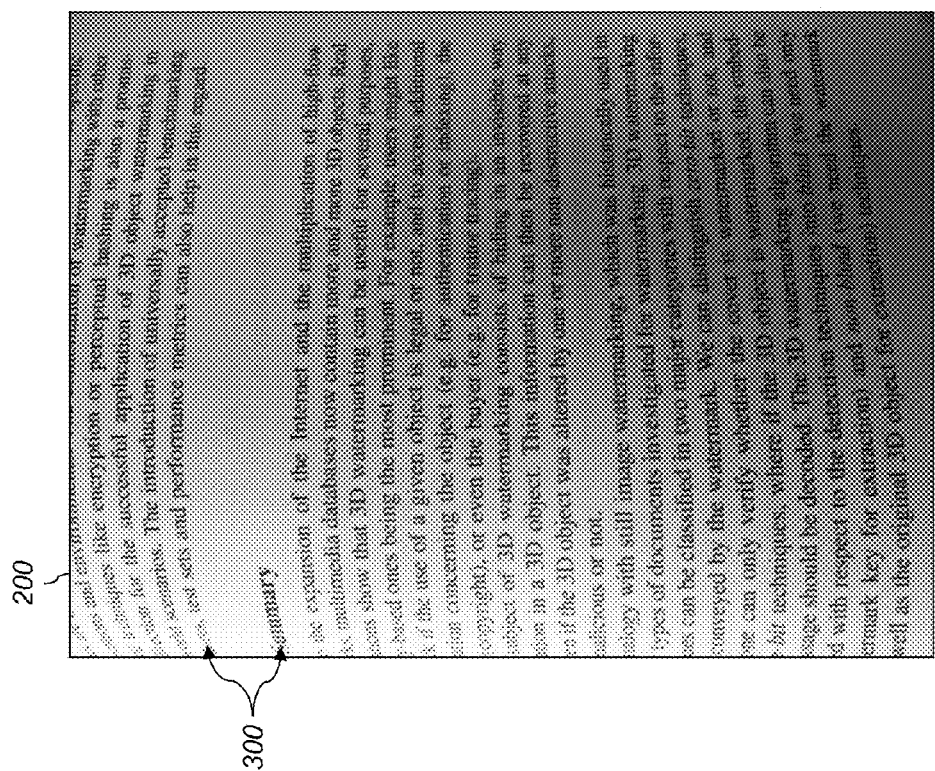
FIG. 3A shows an exemplary input image including warped textual information.

Returning to a discussion of FIG. 2, a determine local feature orientations step 205 is used to analyze the input image 200 to determine local feature orientations 210 for various local features in the input image 200. In a preferred embodiment, the local features include textual features. Within the context of the present disclosure, textual features can be defined to include textual characters, portions of textual characters or groups of connected textual characters, where textual characters can include letters, numbers and other symbols. In some cases, the local features can also include other types of features such as table borders or other types of graphical elements. The present invention takes advantage of the fact that many such local features have a horizontal orientation in the original document. Therefore, determining the local feature orientations 210 provides important information about the geometrical distortions introduced during the image capture process.

Figure 3B:
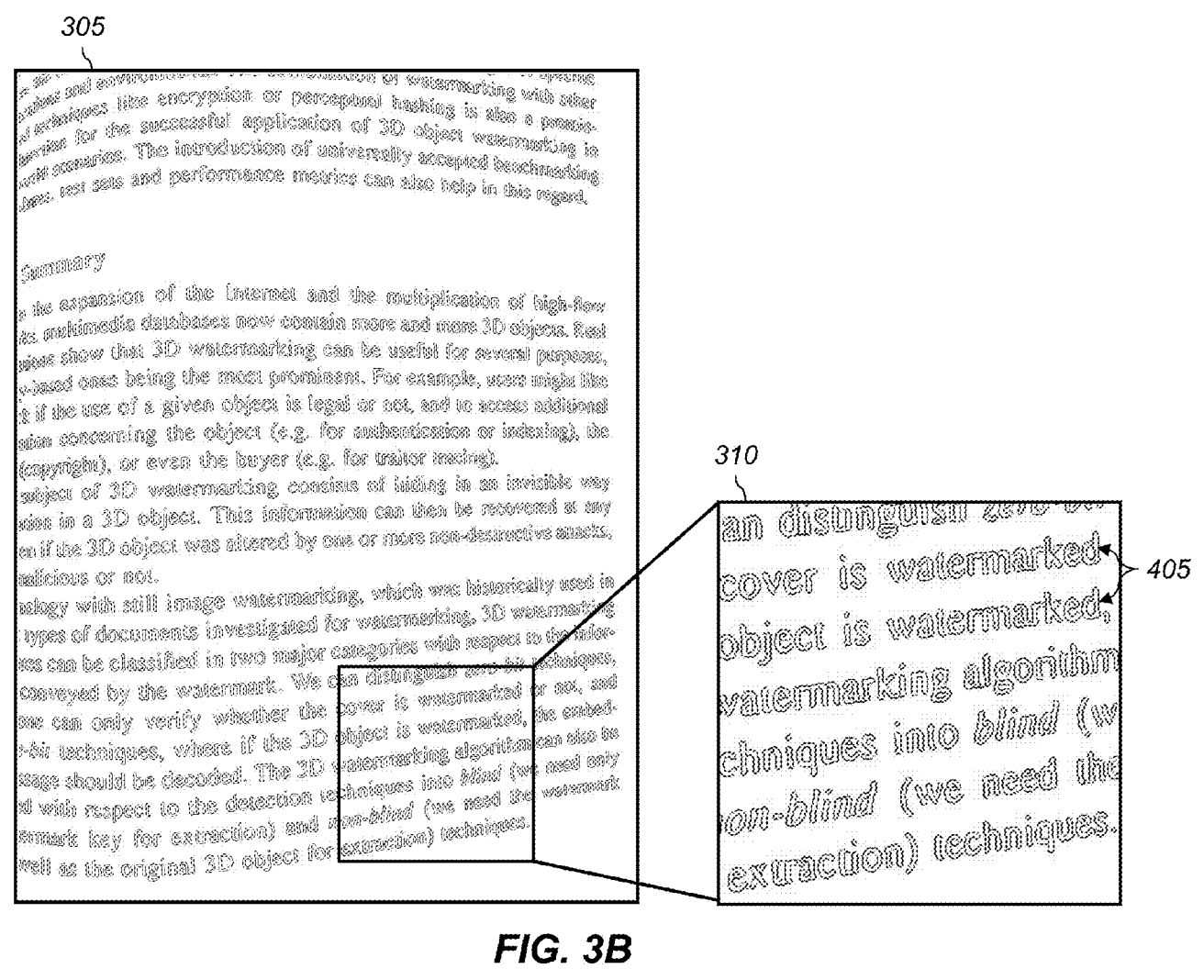

The determine local feature orientations step 205 can determine the local feature orientations 210 using a variety of different methods. In an exemplary embodiment, the local feature orientations 210 are determined using the method shown in FIG. 4. First, a locate local features step 400 is used to analyze the input image 200 to identify local features 405. This step can be performed in a variety of different ways. In a preferred embodiment, the locate local features step 400 applies an edge detection operation to locate edges of structures (e.g., text characters) that occur in the input image 200. FIG. 3B shows an example of an edge image 305 that was determined by applying the well-known Canny edge detection algorithm to the input image 200 of FIG. 3A. This algorithm involves convolving the image with an edge detection filter and performing a threshold operation to identify strong edges. Inset 310 shows an enlarged view showing local features 405 corresponding to the identified text character edges.

In other embodiments, the locate local features step 400 can determine the local features 405 by applying a thresholding operation to the input image 200. The output of this operation is a binary image where the text characters and other local image features are black, while the image background is white. The thresholding operation can include applying a simple fixed threshold (which can be either predefined, or can be determined by analyzing the distribution of pixel values in the input image 200). Such approaches work well when the original document is uniformly illuminated, but can be problematic when the brightness varies across the document. In this case, it is known in the art to use a spatially adaptive threshold, or to use a preprocessing operation to correct the brightness non-uniformity before performing applying the threshold. One such method is described in commonly-assigned U.S. patent application Ser. No. 13/348,676 by Morales, entitled "Method for enhancing a digitized document," which is incorporated herein by reference.

Figure 4:
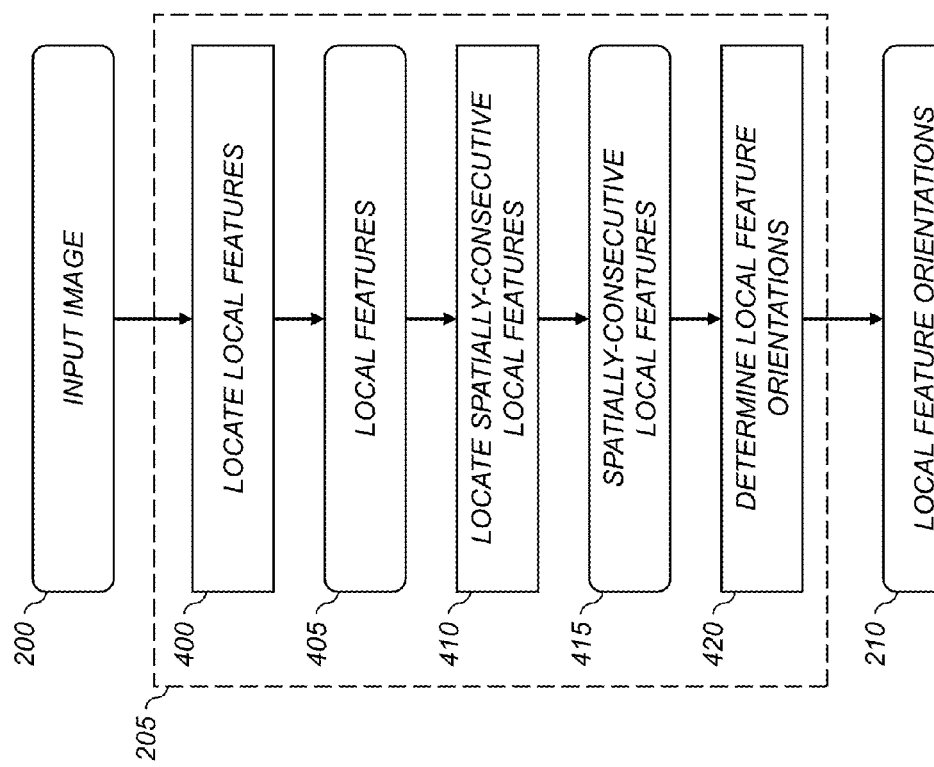
FIG. 4 is a flow diagram showing additional details of the determine local textual features orientations step in FIG. 2 in accordance with an exemplary embodiment.

Returning to a discussion of FIG. 4, a locate spatially-consecutive local features step 410 is used to analyze the local features 405 to determine a set of spatially-consecutive local features 415. In a document containing textual characters, the local features 405 will typically correspond to individual textual characters (e.g., Arabic characters, Kanji, characters, numbers, symbols, etc.). The goal of the locate spatially-consecutive local features step 410 is to connect groups of textual characters together that correspond to words or phrases. In a preferred embodiment, the locate spatially-consecutive local features step 410 performs a sequence of morphological operations to connect the local features 405 together.

Figure 3C:
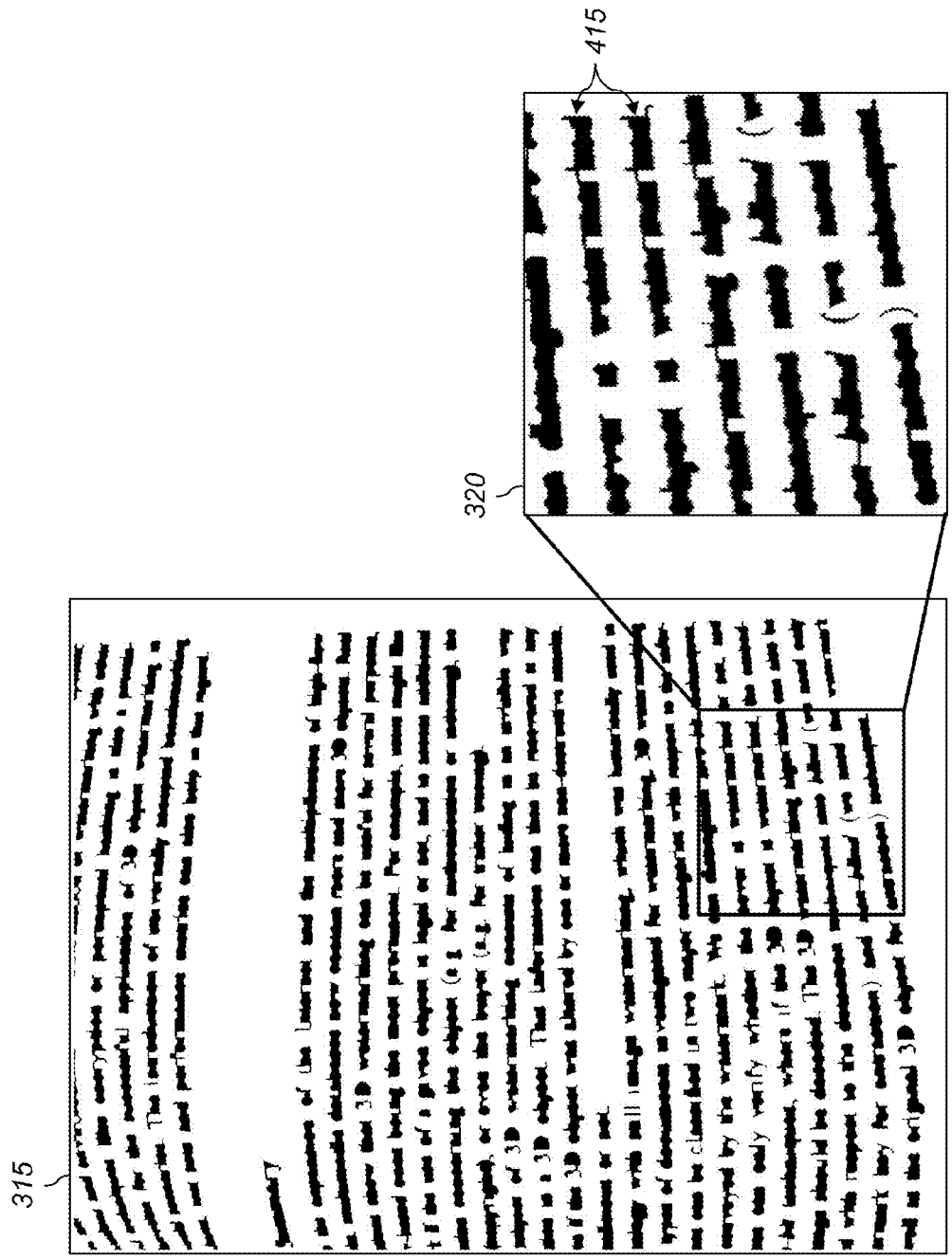
FIG. 3C shows an exemplary image illustrating spatially-consecutive local features.

FIG. 3C shows an example of a connected features image 315 determined from the edge image 305 of FIG. 3B. In this example, the connected features image 315 was determined by applying a dilation operation, followed by a hole-filling operation and an erosion operation. These morphological operations are well-known to those skilled in the art. The dilation operation expands the boundaries of the local features 405, thereby merging nearby local features (e.g., spatially-consecutive characters in a word) into connected features. (In some cases, the erosion operation can be formed repeatedly to expand the size of the local features 405 by a plurality of pixels.) The hole-filling operation fills small holes in the connected features (e.g., open areas in characters). The erosion operation reduces the size of the connected feature region back to approximately its original size by removing pixels around the boundary. This particular sequence of morphological operations is not critical to the present invention, and other sets of processing operations can be used in various embodiments to obtain a similar result. For example, different sets of operations could be performed, or the operations could be performed in a different order (e.g., in some embodiments, only the dilation operation can be performed).

The connected features image 315 can then be analyzed to identify groups of connected pixels. Inset 320 shows an enlarged view showing spatially-connected local features 415. Each spatially-connected local feature 415 contains a plurality of feature pixels (black pixels in this example) that are spatially connected. For the case where the input image contains textual characters, the spatially-connected local features 415 will include words or phrases (i.e., sequences of words) in the original document. The spatially-connected local features 415 may also include other features corresponding to isolated characters or symbols (e.g., parenthesis or punctuation marks), or graphical image content (e.g., table borders).

Returning to a discussion of FIG. 4, a determine local feature orientations step 420 is used to analyze the spatially-consecutive local features 415 to determine the local feature orientations 210. The goal of this step is to determine a predominant orientation for the spatially-consecutive local features 415 that are likely to correspond to horizontal image content in the original document. This determine local feature orientations step 420 can be performed using any method known in the art. In an exemplary embodiment, an ellipse is fit to each of the spatially-consecutive local features 415. Methods for fitting an ellipse to a set of points are well-known to those skilled in the art.

Figure 3D:
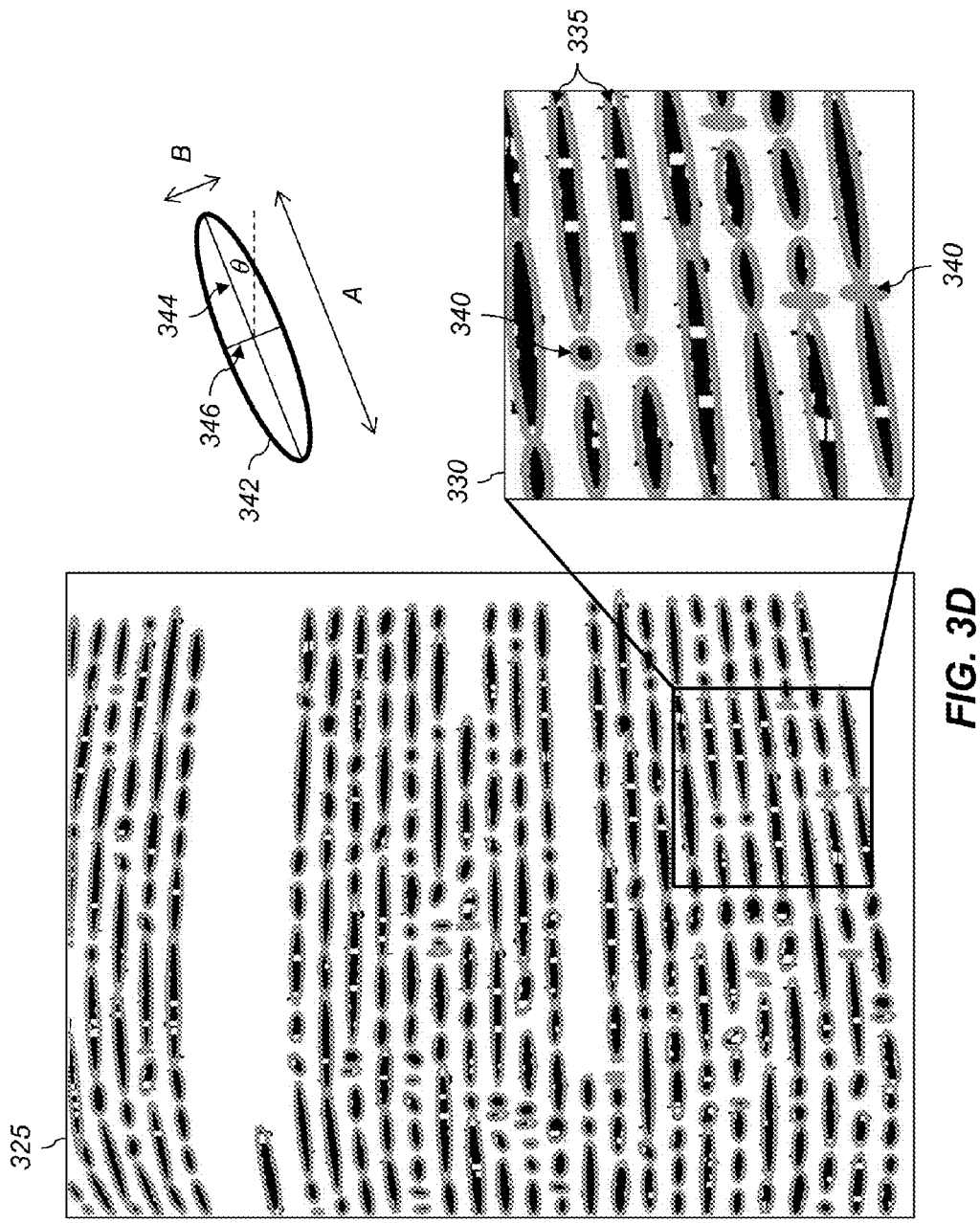
FIG. 3D shows an exemplary image illustrating feature ellipses corresponding to the spatially-consecutive local features of FIG. 3C.

FIG. 3D shows an example of a feature ellipse image 325 corresponding to the connected features image 315 in FIG. 3C. Inset 330 shows an enlarged view including feature ellipses 335 which correspond to words (or groups of words) in the original document. It can be seen that the orientation of major axis of the feature ellipses 335 provide a good indication of the local orientation of the horizontal image content (e.g., text lines) in the deformed document. Other unreliable feature ellipses 340, which correspond to isolated characters or symbols, do not provide reliable information about the local orientation of the horizontal image content. It is therefore desirable to identify the unreliable feature ellipses 340 and eliminate them from consideration during future processing operations.

A series of tests can be applied to the ellipses for each of the identified spatially-consecutive local features 415 to prune out unreliable features. It will be obvious to one skilled in the art, that a variety of different tests can be devised to detect unreliable features. Consider the exemplary feature ellipse 342, having a major axis 344 with major axis length A, a minor axis 346 with minor axis length B and a major axis orientation angle θ. (The major axis orientation angle θ is the angle between the major axis and the positive x-axis direction.) In a preferred embodiment, two tests are applied to identify reliable ellipses. In a first test, an aspect ratio ($R=A/B$) of each ellipse is determined, and any ellipses that do not satisfy a minimum aspect ratio condition ($R \geq R_{min}$) are eliminated, where $R_{min}$ is the minimum acceptable aspect ratio. A value of $R_{min}=4$ has been found to work well in many cases. This first test is useful to eliminate unreliable feature ellipses 340 corresponding to isolated characters and symbols. Such ellipses do not provide any reliable information about horizontal image content.

In a second test, any ellipses that do not satisfy a major axis orientation condition ($-\theta_{max} \leq \theta \leq \theta_{max}$) are eliminated, where $\theta_{max}$ is the maximum acceptable major axis angle. A value of $\theta_{max}=60°$ has been found to work well in many cases. This second test is useful to eliminate unreliable feature ellipses 340 that are unlikely to correspond to horizontal image content (e.g., angled text, vertical table borders, or other graphical features).

In some embodiments, a third test can also be used to identify any spatially-consecutive local features 415 that have unacceptable sizes (either too large, or too small). For example, the size of the spatially-consecutive local features 415 can be characterized by attributes such as the area, the length, or the width of the ellipse. For example, the length of the major axis can be used to define a maximum ellipse size condition ($A \leq A_{max}$), where $A_{max}$ is a maximum acceptable ellipse size. A value of $A_{max}=0.25 \times W$, where W is the width of the input image 200 (or alternatively the width of the text area within the input image 200), has been found to work well in many cases. Such large ellipses may correspond to long strings of words, or to extended graphical features (e.g., table borders). A difficulty with such large ellipses is that the local orientation of the horizontal image content may change significantly across the width of the corresponding spatially-consecutive local feature 415 due to curvature of the document page. In some embodiments, any such large ellipses can simply be eliminated from further consideration. In other embodiments, the corresponding spatially-consecutive local feature 415 can be split into a plurality of smaller subdivided features, each having feature ellipses that satisfy the maximum ellipse size condition. (The feature ellipses for the subdivided features should be evaluated using the minimum aspect ratio condition and the major axis orientation condition described above.)

Figure 3F:
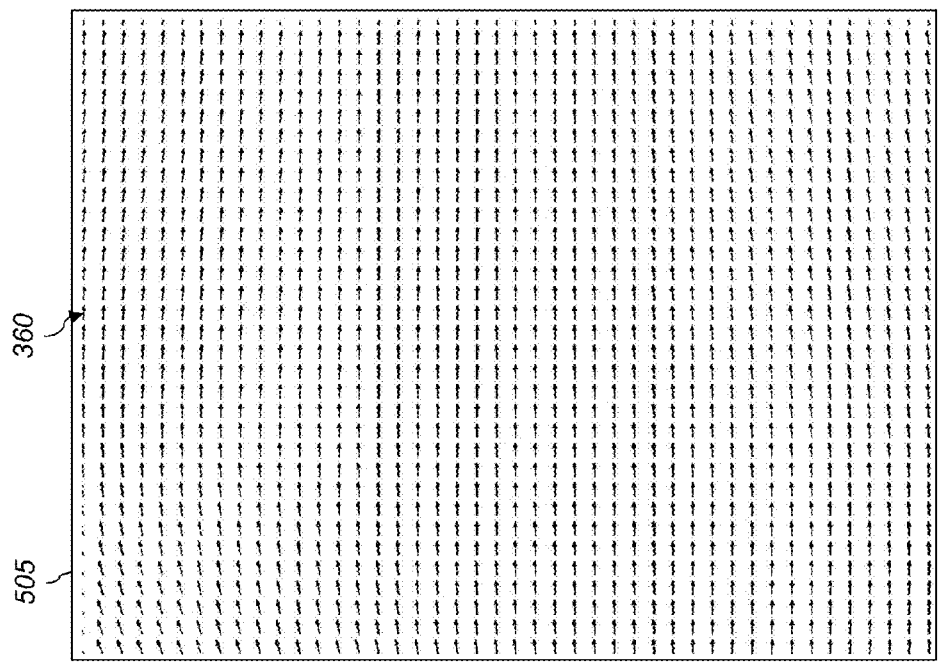
FIG. 3F shows an exemplary image illustrating a dense orientation vector field.
Figure 3E:
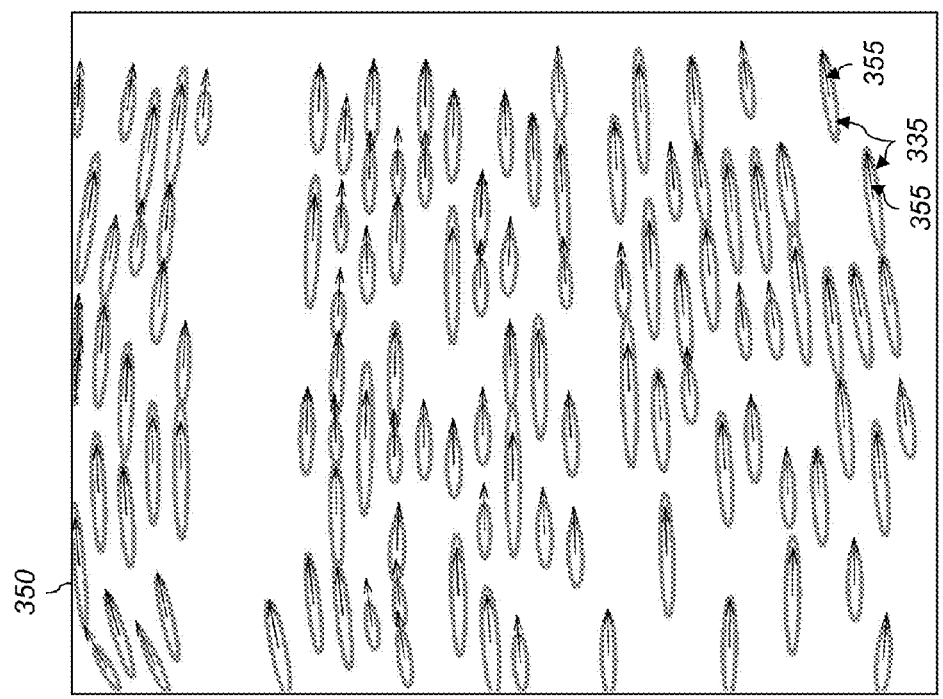
FIG. 3E shows an exemplary image illustrating local feature orientation vectors determined for a set of reliable feature ellipses.

FIG. 3E shows a local feature orientation image 350 corresponding to the feature ellipse image 325 in FIG. 3D. This image includes only those feature ellipses 335 that passed the series of tests to prune out the unreliable feature ellipses 340. Local feature orientation vectors 355 are shown for each of the feature ellipses 335. The local feature orientation vectors 355 are unit vectors having an orientation corresponding to the major axis orientation angle θ. It can be seen that each of the local feature orientation vectors 355 provide a good estimate of the local orientation of the horizontal image content in the input image 200. The local feature orientation vectors 355 are representations of the local feature orientations 210 (FIG. 2).

In other embodiments, the local feature orientations 210 can be determined using other processes. For example, in some embodiments, the input image 200 is subdivided into a set of image regions (e.g., into a grid of image tiles). Each of the image regions can then be analyzed using the method for determining local texture flow direction described by Liang et al. in the article entitled "Flattening Curved Documents in Images" (Proc. IEEE Computer Society Conference on Computer Vision and Pattern Recognition, Vol. 2, pp. 338-345, 2005), which is incorporated herein by reference. Using this method a set of candidate local orientations are evaluated by determining projection profiles and computing associated energy values. The projection profiles are determined by integrating pixels in the image region along paths in the direction of the candidate local orientations. The orientation having the maximum energy value can be designated to be the local feature orientation 210 for the image region. Returning to a discussion of FIG. 2, the local feature orientations 210 are processed using a form global deformation function step 215 to determine a global deformation function 220 that specifies the deformation (i.e., warping) that must be applied to the input digital image as a function of pixel location. The global deformation function 220 can be specified in any appropriate manner. In some embodiments, the global deformation function 220 relates (x,y) positions in the rectified image to corresponding warped image positions in the input image 200. In a preferred embodiment, the global deformation function 220 specifies displacement vectors (e.g., Δy) that can be used to shift the input image 200 to form the rectified image.

In some embodiments, the global deformation function 220 can be a sampled function that gives a deformation value for an array of document positions. Interpolation can then be used to determine deformation values for intermediate document positions. In other embodiments, the global deformation function 220 can be defined as a continuous function which specifies the deformation value (e.g., deformation offsets Δy) as a continuous function of the document position (x,y). For example, the continuous function can be a parametric function (e.g., a polynomial function having parameters for various powers of x and y) which is determined by applying a least squares fitting function to deformation values determined for a sparse set of document positions. Methods for fitting parametric functions are well-known in the art.

Figure 5:
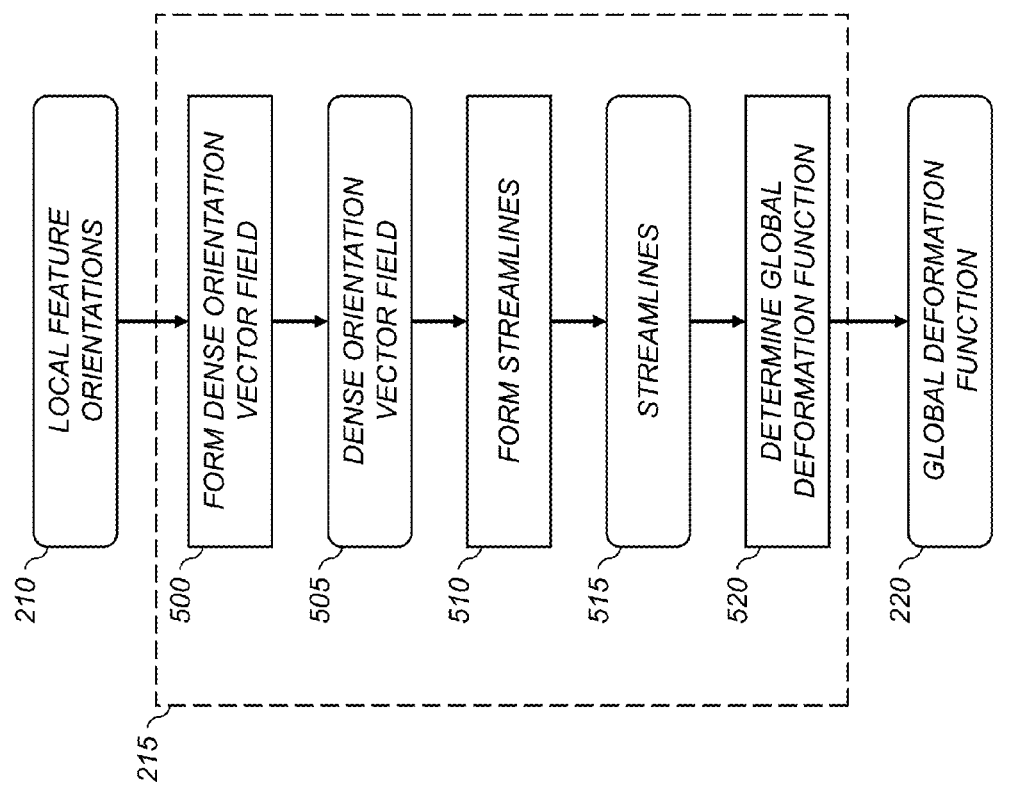
FIG. 5 is a flow diagram showing additional details of the form global deformation function step in FIG. 2 in accordance with an exemplary embodiment.

FIG. 5 shows a flow chart showing additional details for the form global deformation function step 215 according to a preferred embodiment. A form dense orientation vector field step 500 is used to form a dense orientation vector field 505. In a preferred embodiment, the form dense orientation vector field step 500 interpolates between the local feature orientation vectors 355 (FIG. 3E) to determine orientation vectors for a lattice of x-y image positions. In an exemplary embodiment, the lattice of x-y image positions uses a sampling interval of 30 pixels. In other embodiments, the lattice of x-y image positions can be the positions of every pixel in the input image 200. Any appropriate interpolation algorithm known in the art can be used to perform this interpolation. In a preferred embodiment, the well-known thin-plate interpolation method is used.

In other embodiments, the form dense orientation vector field step 500 can determine the dense orientation vector field 505 by fitting an appropriate parametric orientation function to the local feature orientations 210. The parametric orientation function is a function that predicts the orientation angle as a function of the x-y coordinates of the input image 200. Methods for fitting parametric functions to a set of data are well-known in the art. For example, the parametric orientation function can be a polynomial function having parameters for various powers of x and y, where the parameters are determined by applying a least squares fitting function to the local feature orientations 210. Once the parametric function is determined, it can be used to populate the dense orientation vector field 505 by evaluating the parametric function at a lattice of x-y image positions. In some embodiments, the parametric function itself can be used to define the dense orientation vector field 505 rather than using it to form a sampled representation.

FIG. 3F shows a dense orientation vector field 505 corresponding to the local feature orientation image 350. The dense orientation vector field 505 includes a set of local orientation vectors 360 for a lattice of x-y image positions. It can be seen that each local orientation vector 360 is consistent with the nearby local feature orientation vectors 355 (FIG. 3E) in the corresponding region of the local feature orientation image 350.

Returning to a discussion of FIG. 5, a form streamlines step 510 determines a set of streamlines 515 responsive to the dense orientation vector field 505. There are a number of well-known algorithms that can be used to determine a streamline from a vector field, and any appropriate method can be used in accordance with the present invention. In a preferred embodiment, a streamline for a particular y-position is determined by starting at the left edge of the image. The local orientation at that position is determined from the dense orientation vector field 505 (either from the closest node in the lattice, or by interpolating between the orientation vectors for the surrounding lattice positions). The streamline is then extended in that direction for a predefined x-interval (Δx). The local orientation is then determined at this new position, and the process is repeated iteratively to connect together a series of points defining the streamline 515.

FIG. 3G shows a series of streamlines 515 overlaid on the dense orientation vector field 505 of FIG. 3F. The streamlines 515 were determined from the dense orientation vector field 505 using the method described above. It can be seen that the orientation of the streamlines 515 at a given image position is consistent with the orientation at that position in the dense orientation vector field 505. FIG. 3H shows the streamlines 515 of FIG. 3G overlaid on the input image 200 of FIG. 3A. It can be seen that the streamlines 515 follow along the warped text lines in a parallel fashion. The streamlines 515 represent warped lines in the input image 200 that would correspond to straight horizontal lines in the original undeformed document. The streamlines 515 can therefore be used to determine appropriate deformations needed to rectify the input image 200 so that the warped textual information is transformed back to horizontal lines of text.

The global deformation function 220 can be determined from the streamlines 515 in any appropriate manner. In a preferred embodiment, the global deformation function 220 is determined by interpolating between the streamlines 515, each of which effectively defines a deformation function for a horizontal line in the original undeformed document as was discussed above.

Figure 6:
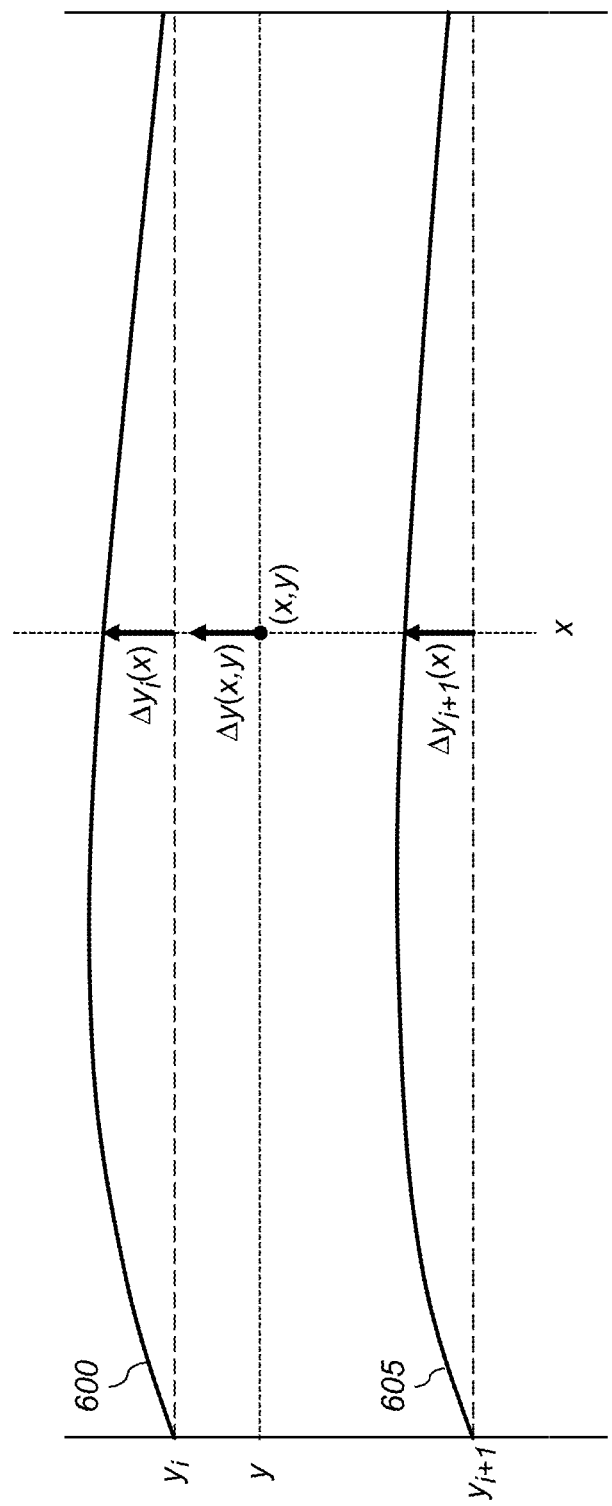
FIG. 6 is a diagram illustrating the determination of a global deformation function from a set of streamlines.

FIG. 6 shows an exemplary pair of streamline 600 and 605. The $i^{th}$ streamline 600 is represented by a deformation offset ($\Delta y_i(x)$) in the y-direction as a function of the x-position. The y-position corresponding to the left end of the streamline ($y_i$) corresponds to a particular y-position in the input image 200 (FIG. 2). Similarly, the $(i+1)^{th}$ streamline 605 is represented by a deformation offset ($\Delta y_{i+1}(x)$) for the y-position $y_{i+1}$. The deformation offset ($\Delta y(x,y)$) for a coordinate (x,y) in the undeformed original image (where $y_i \leq y \leq y_{i+1}$) can be determined using the following equation:

$$\Delta y(x,y) = w_i \Delta y_i(x) + w_{i+1} \Delta y_{i+1}(x) \quad (1)$$

where $w_i$ and $w_{i+1}$ are weighting functions given by:

$$w_i = \frac{y_{i+1} - y}{y_{i+1} - y_i} \quad (2)$$

$$w_{i+1} = \frac{y - y_i}{y_{i+1} - y_i} \quad (3)$$

The deformation offsets ($\Delta y(x,y)$) for each (x,y) coordinate collectively define the global deformation function 220 which can be used to determine a location in the input image 200 corresponding to an (x,y) coordinate in the original undeformed image.

Returning to a discussion of FIG. 2, a form rectified image step 225 is used to form a rectified image 230 by applying the global deformation function 220 to the input image 200. In a preferred embodiment, the pixel value in the rectified image 230 for a particular (x,y) pixel location is determined by using the global deformation function 220 to determine a corresponding pixel location in the input image 200 ($x_i,y_i$).

$$R(x,y) = I(x_i,y_i) \quad (4)$$

where $x_i = x$ and $y_i = y + \Delta y(x,y)$. In general, $y_i$ can be a non-integer value, corresponding to a position between two different pixels in the input image 200. The pixel value for the rectified image 230 (R(x,y)) can be determined using an appropriate interpolation method. In some embodiments, nearest neighbor interpolation can be used in which the R(x, y) is just set to the pixel value for the nearest pixel to ($x_i,y_i$) in the input image 200. In other cases, some other form of interpolation such as the well-known bilinear or bicubic interpolation methods can be used to interpolate between the nearby pixels in the input image 200.

For pixels near the edges of the rectified image 230, the corresponding pixel locations in the input image 200 ($x_i,y_i$) may be outside of the boundary of the input image 200. In this case, the pixel value in the rectified image 230 can be determined in a number of different ways. In some embodiments, the pixel locations can simply be clipped to the boundary of the input image 200. In other embodiments, the pixel values in the rectified image 230 can be set to a predefined value (e.g., white) when ($x_i,y_i$) are outside of the boundary of the input image 200.

Figure 3I:
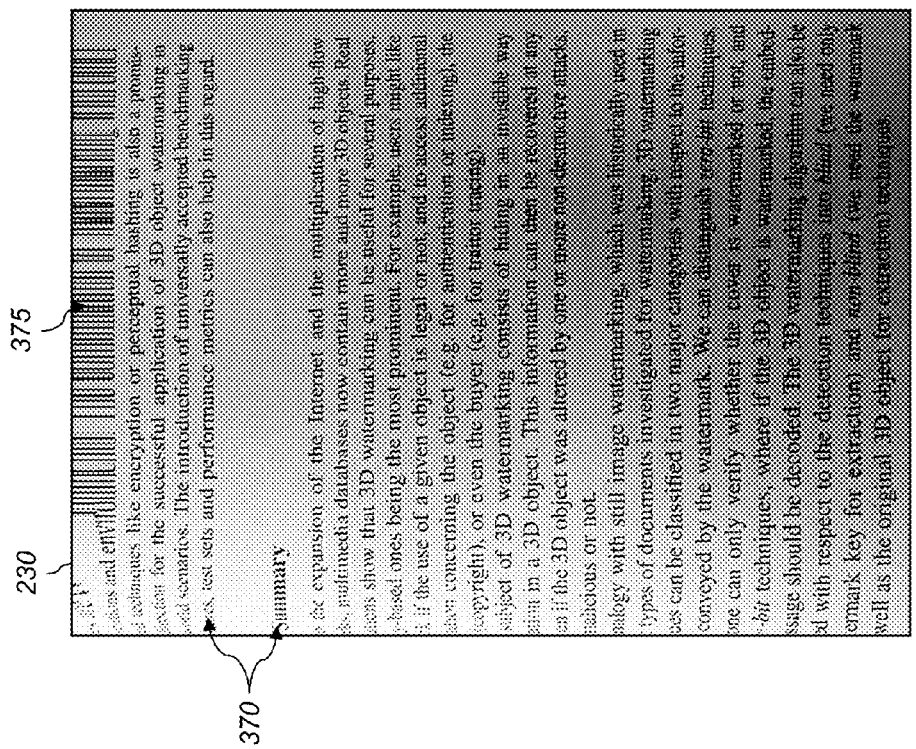
FIG. 3I shows an exemplary rectified image determined in accordance with an embodiment of the present invention.

FIG. 3I shows an example of a rectified image 230 corresponding to the input image 200 of FIG. 3A. It can be seen that the distorted lines of text in the input image 200 have now been warped to form rectified textual information 370 which represent substantially horizontal lines of text. In clipped pixel location 375, the pixel locations ($x_i,y_i$) determined using the global deformation function 220 were outside the boundary of the input image 200 and were clipped as was discussed earlier. It can be seen that this effectively repeats the pixel values along the boundary of the input image 200, forming "streaks" in the rectified image 230.

The above-described embodiment is directed to correct for distortions in horizontal image content. This method has been found to produce good results for rectifying images of documents containing horizontal textual information. However, since the deformation offsets $\Delta y(x,y)$ only shift the image information in a vertical direction, it will have no effect on any distortions that were introduced to vertical features in the original document.

In some embodiments, the image can be rotated by 90° and the above-described method can be run a second time to correct distortions to the vertical image features. However, this makes the assumption that there will be an adequate number of vertical image features in order to determine enough local feature orientations 210 (FIG. 2) to accurately characterize the distortions. This assumption will be valid for many documents such as documents containing vertical table boundaries, graphs or other types of vertical graphical elements. However, it will not be true for many documents that contain only text. In this case, it may be necessary to use alternate techniques to determine local feature orientations 210. For example, the positions of the left and right margins for each text line can be connected to form lines that were vertical in the original document.

Figure 7:
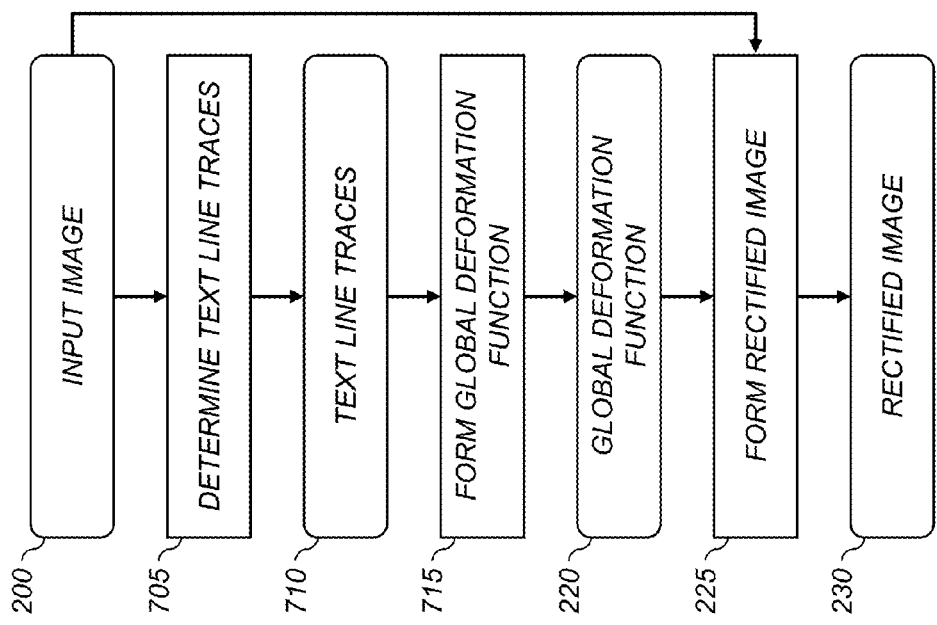
FIG. 7 is a flow diagram of a method for forming a rectified image in accordance with an alternate embodiment.
Figure 8A:
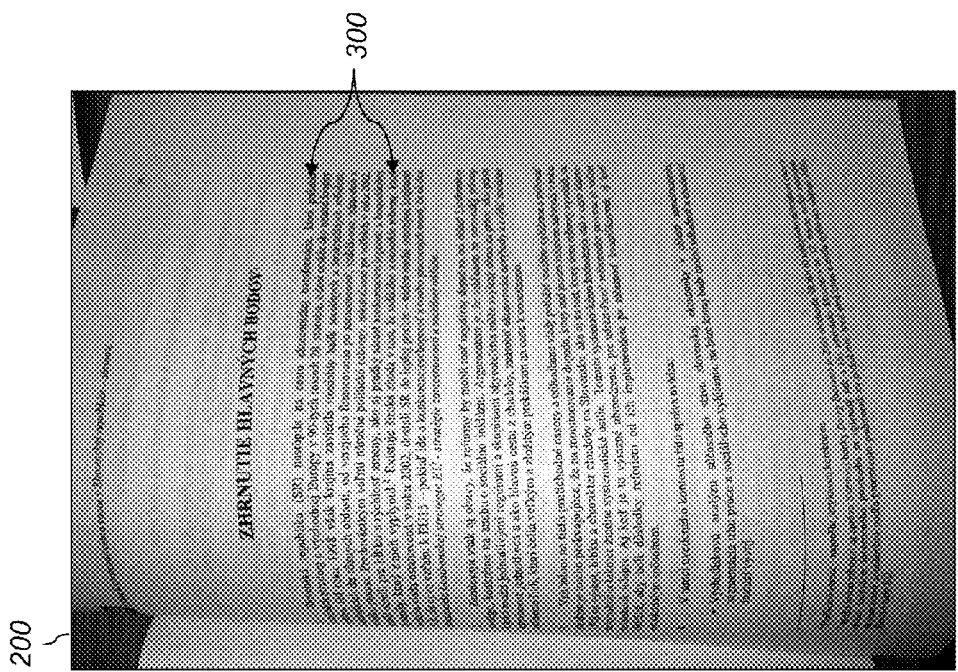
FIG. 8A shows an exemplary input image including warped textual information.

FIG. 7 illustrates an alternate embodiment of the present invention wherein the global deformation function 220 is formed based on determining a set of text line traces 710. As with the method of FIG. 2, the input to the process is an input image 200 that includes warped textual information. FIG. 8A shows an example of an input image 200 corresponding to an image of a page of a book captured using a camera phone. The input image 200 contains warped textual information 300 where lines of text that occurred as horizontal lines in the original document (i.e., book page) are reproduced as warped curves due to geometrical distortion. As with the example shown in FIG. 3A, most of the geometrical distortion in this case results from the book page being curved at the time that the image was captured due to the binding of the book.

A determine text line traces step 705 is used to analyze the input image 200 to determine a set of text line traces 710. The text line traces 710 are paths through the input image 200 that track along and are substantially parallel with the lines of warped textual information 300 (FIG. 8A). The text line traces 710 can be determined using any method known in the art.

Figure 8C:
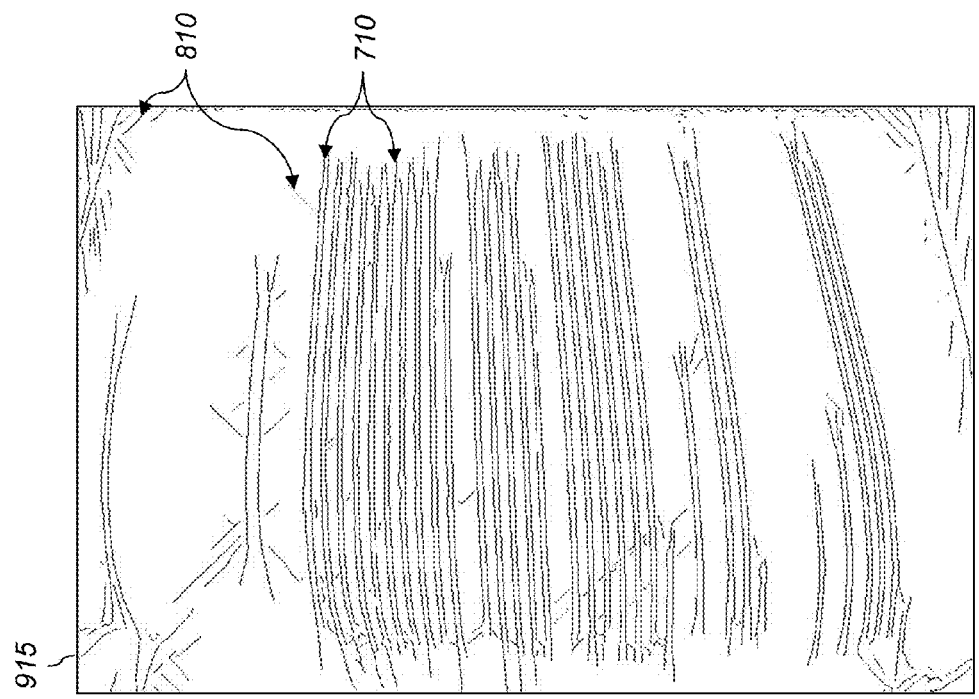
FIG. 8C shows an exemplary edge traces image.
Figure 8B:
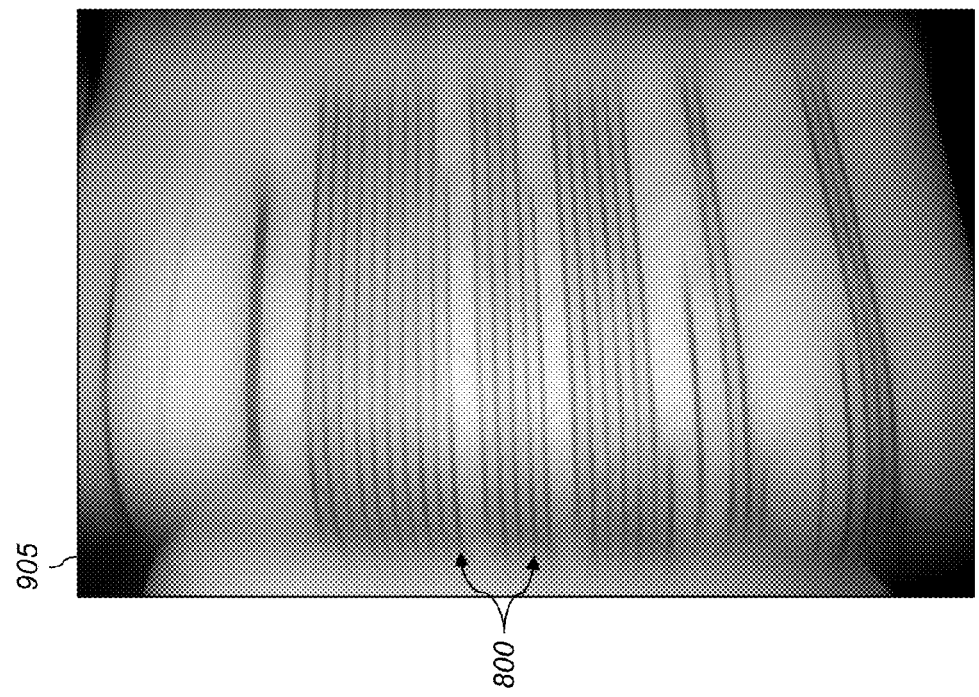
FIG. 8B shows an exemplary filtered image determined using a multi-oriented-Gaussian filter.
Figure 9:
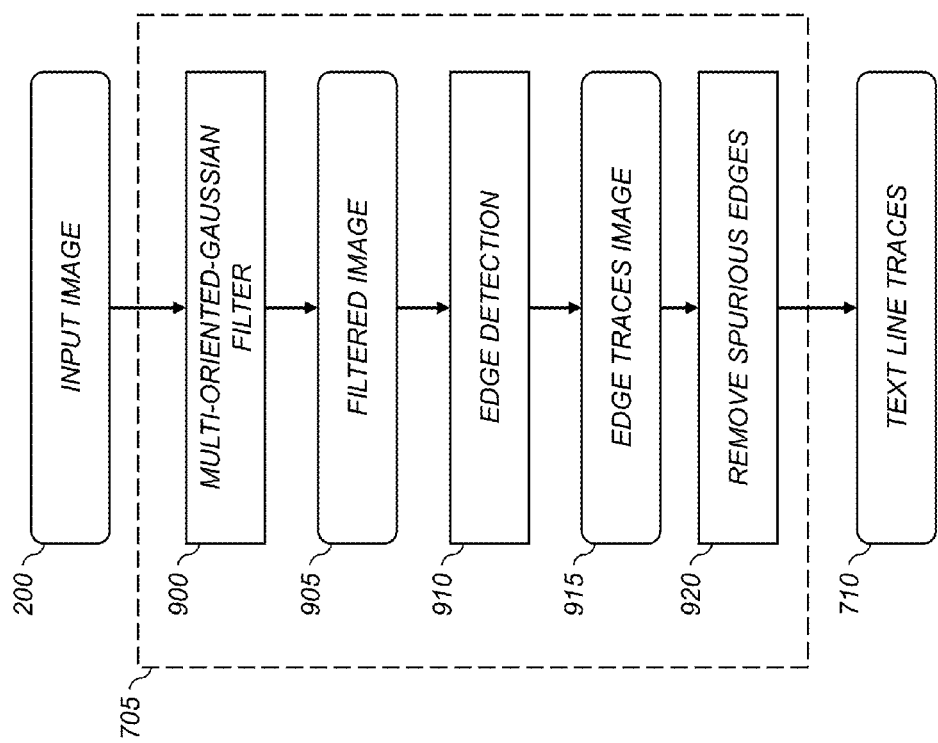
FIG. 9 is a flow diagram showing additional details of the determine text line traces step in FIG. 7 in accordance with an exemplary embodiment.

Additional details for one embodiment of the determine text line traces step 705 are shown in FIG. 9. A multi-oriented-Gaussian filter step 900 is used to produce a filtered image 905. Preferably, the multi-oriented-Gaussian filter step 900 applies the filtering method described in the article by Bukhari et al., entitled "Script-independent handwritten textlines segmentation using active contours" (10th International Conference on Document Analysis and Recognition, pp. 446-450, 2009), which is incorporated herein by reference. According to this approach, a bank of anisotropic Gaussian filters are defined having σx>σy, where the filters have a variety of orientation angles θ. The input image 200 is filtered with each filter in the filter bank, and the smallest (darkest) filtered pixel value for each pixel position is used to define the filtered image 905. FIG. 8B shows an example of a filtered image 905 determined from the input image 200 of FIG. 8B. It can be seen that the effect of applying the multi-oriented-Gaussian filter step 900 is that the characters in a text line are blurred together to form blurred text lines 800, while the different text lines are not blurred significantly with each other.

The determine text line traces step 705 can also determine the text line traces 710 using a variety of other methods. For example, the article "Rectification and 3D reconstruction of curved document images" by Tian (Proc. IEEE Computer Society Conference on Computer Vision and Pattern Recognition, pp. 377-384, 2011) describes a line tracing method that uses a self-similarity measure to determine traces for text lines in a document.

Returning to a discussion of FIG. 9, an edge detection step 910 is applied to the filtered image 905 to determine an edge traces image 915. Any edge detection method known in the art can be used in accordance in the present invention. In a preferred embodiment, the edge detection step 910 uses the well-known Canny edge detection algorithm. FIG. 8C shows an example of an edge traces image 915 corresponding to the filtered image 905 of FIG. 8B. It can be seen that two text line traces 710 are generally formed for each blurred text line 800 (FIG. 8B)—one corresponding to a lower side of the blurred text line 800, and one corresponding to an upper side of the blurred text line 800. The edge traces image 915 also includes spurious edge traces 810 that do not correspond to lines of text in the input image 200 (FIG. 8A). Such lines can originate from a variety of different sources including lighting gradations and wrinkles in the original document.

A remove spurious edges step 920 is used to analyze the edge traces image 915 and remove any spurious edge traces 810 that are detected. The spurious edge traces 810 can be identified using any appropriate means. For example, a local orientation of the edge traces can be determined and any edge traces having an orientation that is inconsistent with other nearby edge traces can be removed.

In an exemplary embodiment, the spurious edge traces 810 are identified using the following process. First the edge traces image 915 is analyzed to determine the vertical separation distance between each edge pixel and the nearest neighboring edge pixel in the vertical direction (either above or below the edge pixel). A distribution of the vertical separation distances is then formed, and a mode (M) of the distribution is determined corresponding to the most commonly occurring vertical separation distance ($D_V$). As can be seen from the example edge traces image 915 in FIG. 8C, the text line traces 710 generally occur in pairs corresponding to the top and bottom edges of the blurred text lines 800 (FIG. 8B). The determined mode will therefore generally correspond to the vertical separation distance between the pairs of text line traces 710. Any edge pixels that are not separated from the nearest neighboring edge pixel by a vertical separation distance approximately equal to this mode are likely to correspond to spurious edge traces 810 rather than text line traces 710. In the exemplary embodiment, the vertical separation distance ($D_V$) for each edge pixel is compared to a predefined range (M−ΔM ≤ $D_V$ ≤ M+ΔM), where ΔM is a range size parameter, and any edge pixels having vertical separation distances that do not fall within the predefined range are assumed to be spurious edge traces 810 and are eliminated. For many images, it has been found that setting ΔM=0.5×M produces good results. It will be obvious to one skilled in the art that the predefined range can be determined in a variety of ways based on appropriate statistical measures (e.g., the median or the mean) for the distribution of the vertical separation distances. In other embodiments, the range can be predefined and does not depend on the distribution of the vertical separation distances.

Figure 8D:
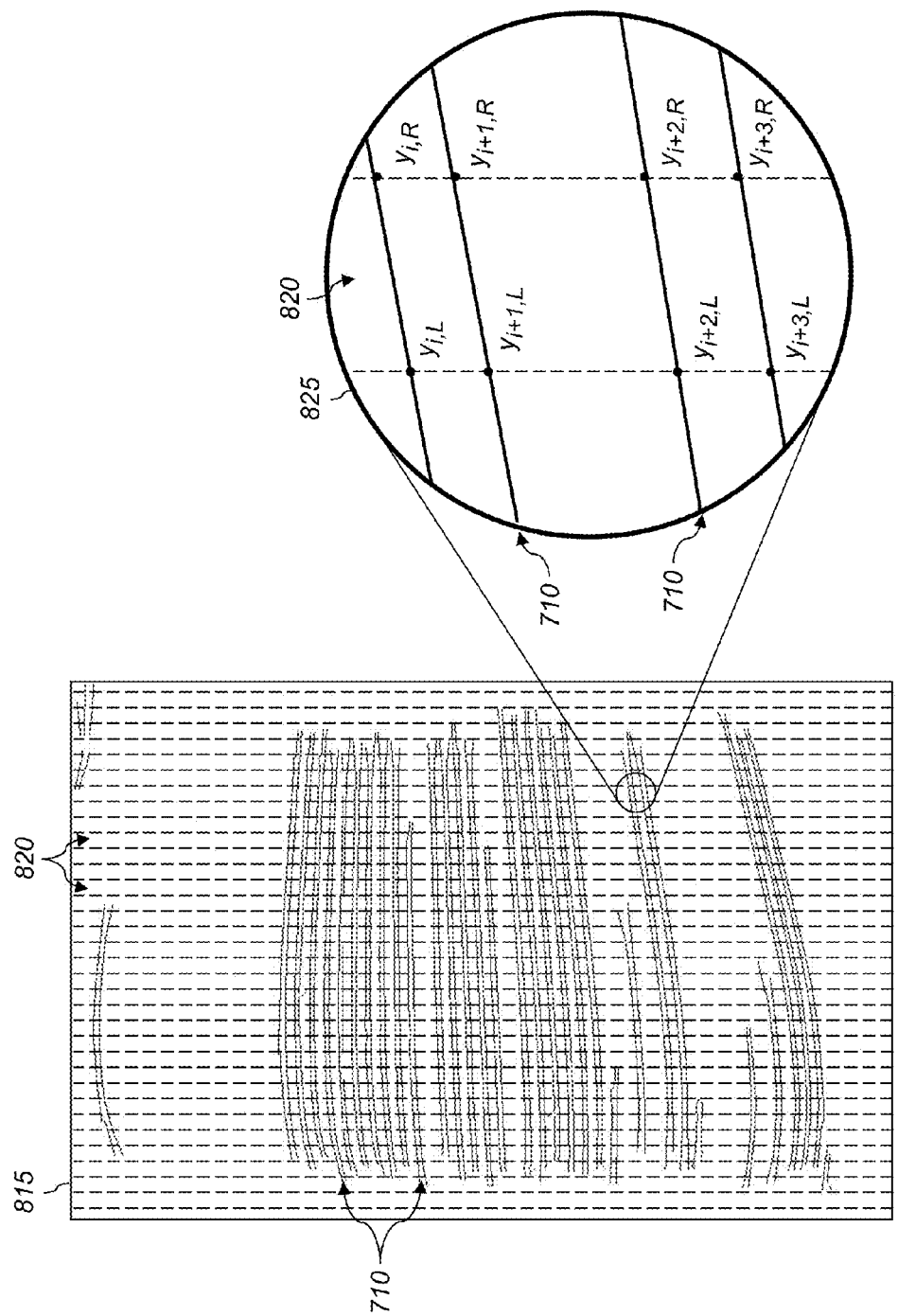
FIG. 8D shows an exemplary cleaned edge traces image where spurious edge traces have been removed.

FIG. 8D shows a cleaned edge traces image 815 where the spurious edge traces 810 in FIG. 8C have been removed, leaving text line traces 710. It can be seen that the text line traces 710 provide information about the geometrical distortions associated with the warped textual information 300 in FIG. 8A.

In some embodiments, the text line traces 710 determined using the method of FIG. 9 can be used to provide local feature orientations 210 that can be used in accordance with the embodiment discussed above with reference to FIG. 2. In this case, the text line traces 710 can be subdivided into short line segments (e.g., having a width of 10 pixels) which are used as local features. The local feature orientations 210 for the local features can be determined by the vector connecting the left and right endpoints of the line segments. These local feature orientations 210 can then be used to determine the global deformation function 220 and the rectified image 230 as described earlier.

Figure 10:
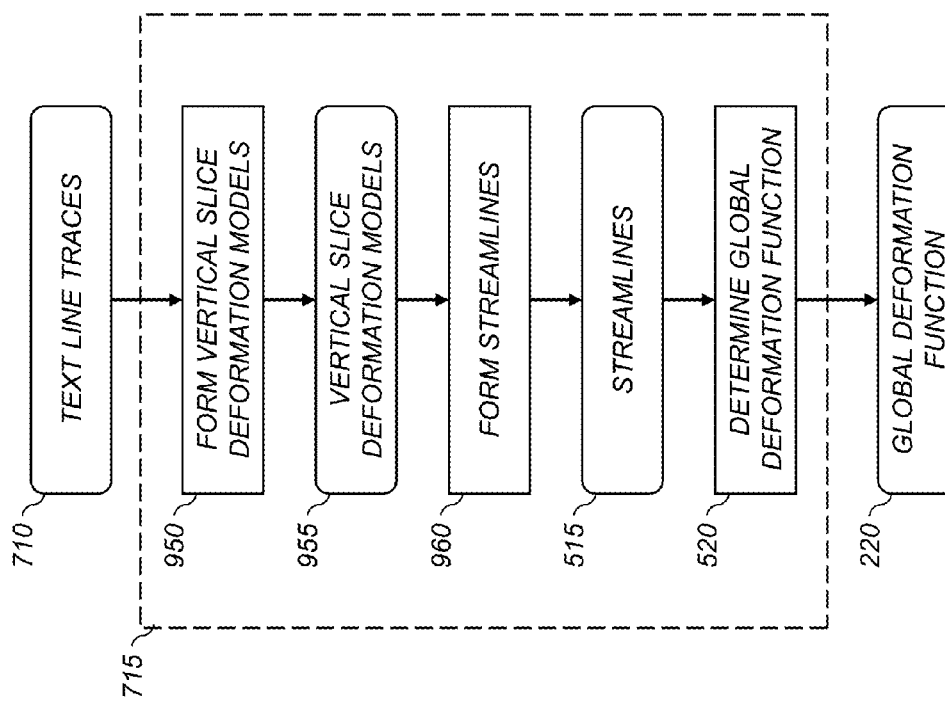
FIG. 10 is a flow diagram showing additional details of the form global deformation function step in FIG. 7 in accordance with an exemplary embodiment.

Returning to a discussion of FIG. 7, a form global deformation function step 715 is then used to form the global deformation function 220 responsive to the text line traces 710. FIG. 10 shows additional details for how this step can be performed according to a preferred embodiment.

First, the cleaned edge traces image 815 is divided into a series of vertical slices 820 as shown in FIG. 8D. The vertical slices 820 have a first slide edge (e.g., a left edge) and a second slice edge (e.g., a right edge) separated by a predefined slice width (e.g., 4 pixels). A form vertical slice deformation models step 950 is then used to determine a vertical slice deformation model 955 for each of the vertical slices 820.

In a preferred embodiment, the vertical slice deformation model 955 for a particular vertical slice 820 is determined by identifying the set of text line traces 710 that span the width of the vertical slice 820. The vertical coordinates of the text line traces 710 at the left and right edges of the vertical slice 820 are then determined as illustrated in the inset 825 in FIG. 8D. (For the $i^{th}$ text line trace, the vertical coordinate of the left edge is given by $y_{i,L}$ and the vertical coordinate of the right edge is given by $y_{i,R}$.) Note that for this example, the left edge is assumed to be the "first slice edge" and the right edge is assumed to be the "second slice edge," however those skilled in the art will recognize that they could be trivially reversed.

The vertical slice deformation model 955 is then determined by fitting a parametric model to the set of set of coordinates ($y_{i,L}$,$y_{i,R}$). In an exemplary embodiment, the parametric model is a linear model of the form:

$$Y_R = \alpha_j + \beta_j Y_L \quad (5)$$

where $\alpha_j$ and $\beta_j$ are fitting constants for the $j^{th}$ vertical slice 820. Linear models of this type have been found to work well in many cases. In other embodiments, a nonlinear parametric model can be used, such as a higher-order polynomial model:

$$Y_R = \alpha_j + \beta_j Y_L + \gamma_j Y_L^2 \quad (6)$$

where $\alpha_j$, $\beta_j$ and $\gamma_j$ are fitting constants for the $j^{th}$ vertical slice 820. Generally, in order to determine a reliable vertical slice deformation model 955 for a particular vertical slice 820 it is necessary that at least a minimum number (e.g., 6) text line traces 710 span the width of the vertical slice 820, preferably distributed at a variety of positions along the vertical slice 820. If any of the vertical slices 820 have an insufficient number of text line traces 710 to determine a reliable vertical slice deformation model 955 (for example, the vertical slices 820 near the left and right sides of the cleaned edge traces image 815 in FIG. 8D), then the vertical slice deformation models 955 for these vertical slices 820 can be estimated based on the vertical slice deformation models 955 for other nearby vertical slices 820. In some embodiments, the vertical slice deformation model 955 for the nearest vertical slice 820 for which a valid model was determined is simply copied. In other cases, a fitting constant model can be fit to the fitting constants (e.g., $\alpha_j$ and $\beta_j$) as a function of stripe number j. The fitting constant model can then be evaluated to estimate the parametric model for the vertical slices 820 for which a valid model could not be formed.

Figures 8E, 8F:
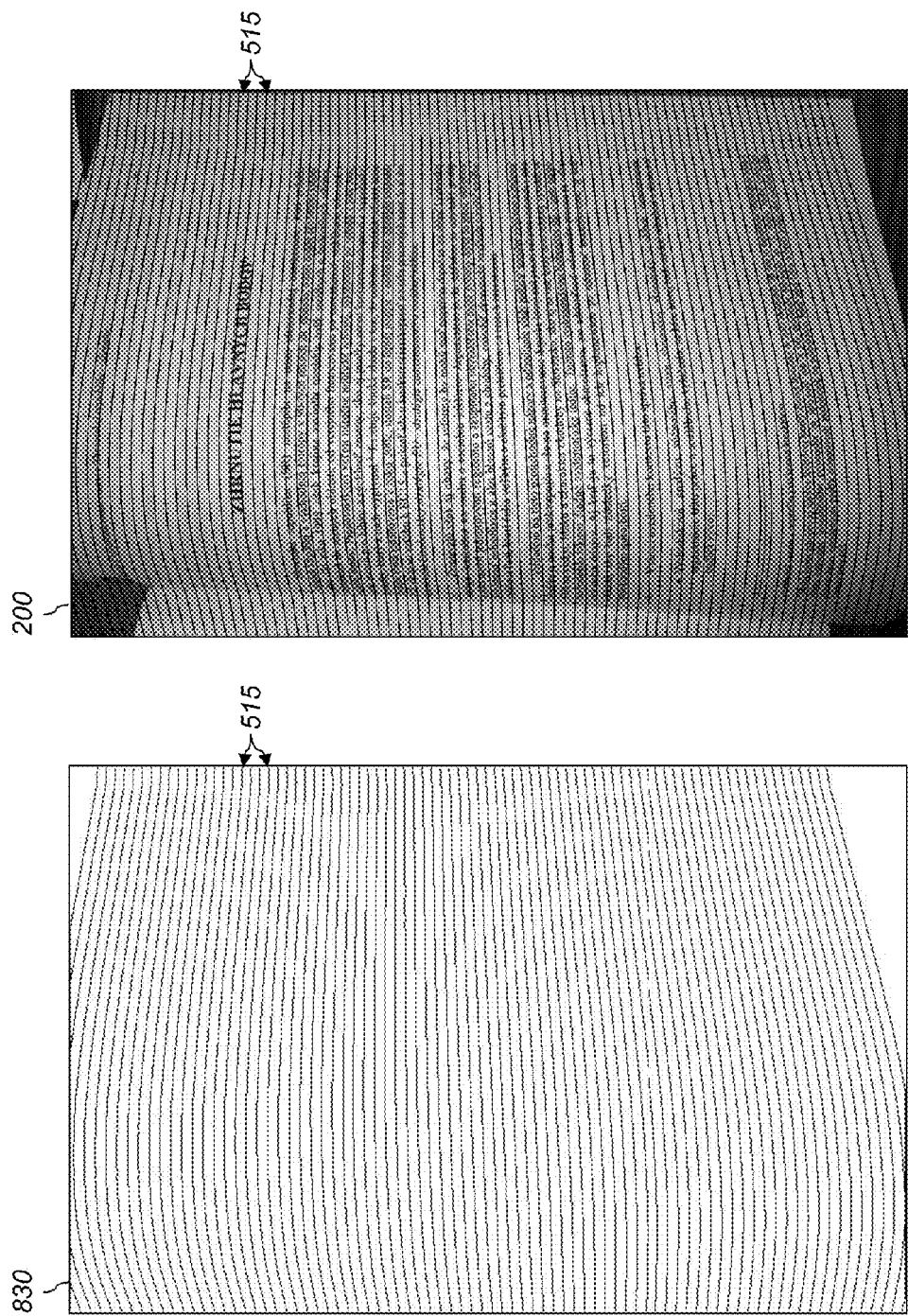
FIG. 8E shows an exemplary image illustrating a set of streamlines.
FIG. 8F shows the streamlines of FIG. 8E overlaid on the input image of FIG. 8A.

Returning to a discussion of FIG. 10, a form streamlines step 960, is then used to form a series of streamlines 515 responsive to the vertical slice deformation models 955. In a preferred embodiment, the streamlines 515 are determined by starting with a set of equally spaced initial points at the left edge of the document. The vertical slice deformation model 955 for the first vertical slice 820 is then used to find corresponding vertical coordinates for each streamline at the right edge of the first (j=1) vertical slice 820. Similarly, the vertical slice deformation model 955 for the second (j=2) vertical slice 820 is then used to find corresponding vertical coordinates for each streamline at the right edge of the second vertical slice 820. This process is repeated to trace the streamlines 515 across to the right edge of the document. FIG. 8E shows a streamline image 830 including a set of streamlines 515 determined in this manner based on the vertical slice deformation models 955 for the cleaned edge traces image 815 of FIG. 8D. In FIG. 8F, these streamlines 515 are superimposed on the input image 200 of FIG. 8A. It can be seen that the streamlines 515 follow along the warped text lines in a parallel fashion.

Continuing with a discussion of FIG. 10, determine global deformation function step 520 is used to determine the global deformation function 220 responsive to the streamlines 515. This step is equivalent to the determine global deformation function step 520 of FIG. 5, and can be performed in a similar fashion.

Figure 8G:
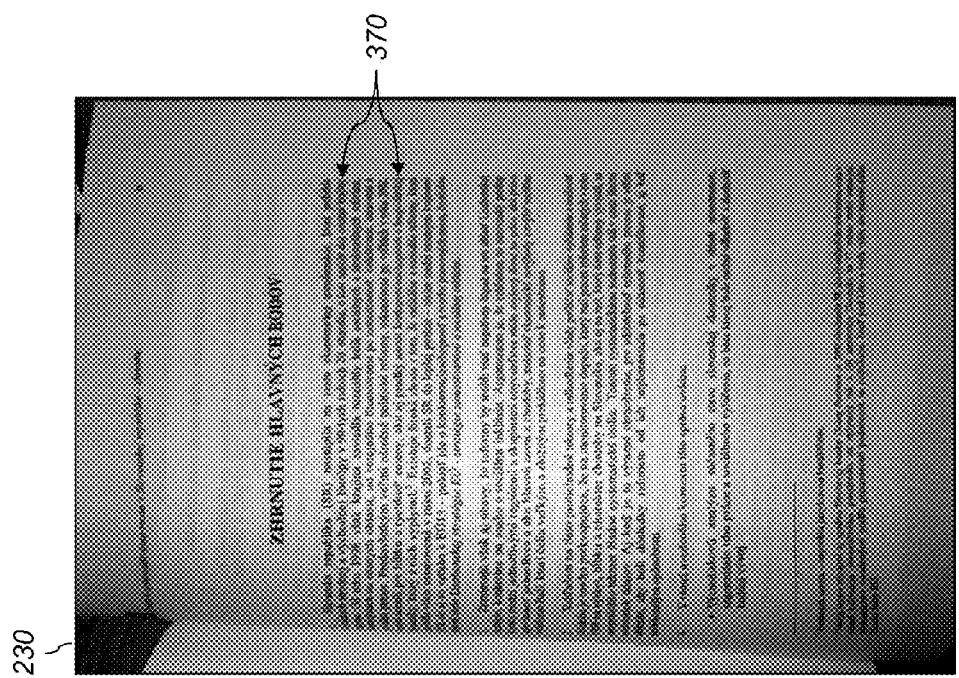
FIG. 8G shows an exemplary rectified image determined in accordance with the method of FIG. 7.

Returning to a discussion of FIG. 7, form rectified image step 225 can then be used to determine the rectified image 230 responsive to the determined global deformation function 220. This step is equivalent to the form rectified image step 225 of FIG. 2, and can be performed in a similar fashion. FIG. 8G shows an exemplary rectified image 230 including rectified textual information 370 determined in this manner based on the input image 200 of FIG. 8A.

A computer program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 110 data processing system
120 peripheral system
130 user interface system
140 data storage system
200 input image
205 determine local feature orientations step
210 local feature orientations
215 form global deformation function step
220 global deformation function
225 form rectified image step
230 rectified image
300 warped textual information
305 edge image
310 inset
315 connected features image
320 inset
325 feature ellipse image
330 inset
335 feature ellipse
340 unreliable feature ellipse
342 feature ellipse
344 major axis
346 minor axis
350 local feature orientation image
355 local feature orientation vector
360 local orientation vector
370 rectified textual information
375 clipped pixel location region
400 locate local features step
405 local features
410 locate spatially-consecutive local features step
415 spatially-consecutive local features
420 determine local feature orientations step
500 form dense orientation vector field step
505 dense orientation vector field
510 form streamlines step
515 streamlines
520 determine global deformation function step
600 streamline
605 streamline
705 determine text line traces step
710 text line traces
715 form global deformation function step
800 blurred text lines
810 spurious edge traces
815 cleaned edge traces image
820 vertical slice
825 inset
830 streamline image
900 multi-oriented-Gaussian filter step
905 filtered image
910 edge detection step
915 edge traces image
920 remove spurious edges step
950 form vertical slice deformation models step
955 vertical slice deformation models
960 form streamlines step
A major axis length
B minor axis length
θ major axis orientation angle

The invention claimed is:

1. A method for rectifying an input digital image including warped textual lines, the method implemented at least in part by a data processing system and comprising:
receiving an input digital image;
analyzing the input digital image to determine a plurality of text line traces that track along with the warped textual lines in a substantially parallel fashion;
subdividing the input digital image into a plurality of vertical slices, each vertical slice having associated first and second slice edges and an associated slice width;
forming vertical slice deformation models for a plurality of the vertical slices by:
identifying a plurality of text line traces that cross a particular vertical slice, each of the identified text line traces having a first-edge vertical coordinate corresponding to the location where the text line trace crosses the first slice edge and a second-edge vertical coordinate corresponding to the location where the text line trace crosses the second slice edge of the vertical slice; and
forming the vertical slice deformation model for the particular vertical slice by fitting a parametric function that predicts the second-edge vertical coordinates as a function of the first-edge vertical coordinates;
forming a plurality of streamlines responsive to the vertical slice deformation models, wherein the streamlines represent a deformation of the warped textual lines in the input digital image;
forming a global deformation function by interpolating between the streamlines;
forming a rectified image by rectifying the input digital image responsive to the global deformation function; and
storing the rectified image in a processor-accessible memory.

2. The method of claim 1 wherein the determination of the text line traces includes:
determining a filtered image having filtered pixels values, wherein each filtered pixel value is determined by filtering the input image with a plurality of anisotropic Gaussian filters having a variety of orientation angles to provide a corresponding plurality of candidate filtered pixel values and selecting the smallest candidate largest filtered pixel value;
applying an edge detection operation to the filtered image to determine an edge trace image including a plurality of edge traces; and
designating at least some of the edge traces to be text line traces.

3. The method of claim 2 further including:
analyzing the edge trace image to identify spurious edge traces that are unlikely to correspond to the warped textual lines;
removing any identified spurious edge traces from the edge trace image; and
designating the remaining edge traces to be text line traces.

4. The method of claim 3 wherein the spurious edge traces are identified by determining a vertical separation distance between each edge pixel in the edge trace image and the nearest neighboring edge pixel in the vertical direction, and designating any edge pixels where the determined vertical separation distance falls outside of a predefined range to belong to a spurious edge trace.

5. The method of claim 4 wherein the predefined range is defined based on a distribution of vertical separation distances for the edge pixels in the edge trace image.

6. The method of claim 5 wherein the predefined range is defined to be $M-\Delta M \leq D_V \leq M+\Delta M$, where $D_V$ is the vertical separation distance, M is the mode of the distribution of vertical separation distances, and $\Delta M$ is a range size parameter.

7. The method of claim 1 wherein the parametric function for the vertical slice model is a linear parametric model.

8. The method of claim 1 wherein the parametric function for the vertical slice model is a nonlinear parametric model.

9. The method of claim 1 wherein the streamlines are formed by:
defining a set of initial points on one side of the input digital image; and
starting with the initial points, tracing out the streamlines across the by sequentially applying the vertical slice deformation models.

10. The method of claim 1 wherein the formation of the vertical slice deformation models further includes:
identifying any vertical slices that are crossed by an insufficient number of text line traces to determine a reliable vertical slice deformation model;
estimating vertical slice deformation models for the identified vertical slices based on vertical slice deformation models for other nearby vertical slices.

11. The method of claim 1 wherein the global deformation function is represented using a two-dimensional look-up table that stores displacement vectors for a lattice of image positions.

12. The method of claim 1 wherein the global deformation function is represented using a two-dimensional look-up table that stores warped image positions corresponding to a lattice of rectified image positions.

13. The method of claim 1 wherein the global deformation function is represented using a parametric function that computes displacement vectors as a function of position in the input digital image.

14. The method of claim 1 wherein the textual lines include textual features corresponding to characters, portions of characters or groups of characters.

* * * * *